United States Patent [19]

Lofquist et al.

[11] Patent Number: 4,591,473
[45] Date of Patent: May 27, 1986

[54] METHOD OF SPINNING A NYLON YARN HAVING IMPROVED RETENTION OF A SOIL REPELLENT FINISH ON THE NYLON YARN

[75] Inventors: Robert A. Lofquist; Gene C. Weedon, both of Richmond; Charles J. Cole, Chester, all of Va.

[73] Assignee: Allied Corporation, Morris Township, Morris County, N.J.

[21] Appl. No.: 591,244

[22] Filed: Mar. 20, 1984

Related U.S. Application Data

[63] Continuation of Ser. No. 440,881, Nov. 12, 1982, abandoned.

[51] Int. Cl.[4] .................. B29C 59/00; C08J 9/36; C08G 69/04; D01F 6/90
[52] U.S. Cl. .................. 264/129; 264/176 F; 528/336
[58] Field of Search .................. 264/129, 176 F; 528/336

[56] References Cited

U.S. PATENT DOCUMENTS

| | | | |
|---|---|---|---|
| 2,585,199 | 2/1952 | Watson | 528/336 |
| 3,294,756 | 12/1966 | Russell et al. | |
| 3,296,216 | 1/1967 | Snooks, Jr. | 528/336 |
| 3,300,448 | 1/1967 | Gauthier, Jr. et al. | 528/336 |
| 3,304,289 | 2/1967 | Ballentine et al. | 528/336 |
| 3,310,534 | 3/1967 | Brignac et al. | 528/336 |
| 3,511,815 | 5/1970 | Sayin | 528/336 |
| 3,544,527 | 12/1970 | Pietrusza et al. | 528/336 |
| 4,192,754 | 3/1980 | Marshall et al. | 252/8.8 |
| 4,310,659 | 1/1982 | Yates et al. | |
| 4,385,170 | 5/1983 | Hirami et al. | 528/336 X |
| 4,476,280 | 10/1984 | Poppe et al. | 528/338 X |

Primary Examiner—Philip Anderson
Attorney, Agent, or Firm—Richard A. Anderson

[57] ABSTRACT

This invention is a method to improve retention of a finish on nylon yarn, said finish containing the reaction product of epichlorohydrin with the reaction product of pyromellitic dianhydride with a long chain fluoroalcohol, comprising polymerizing said nylon in the presence of about 0.5 to 1 mole percent of a primary-tertiary diamine of the structure

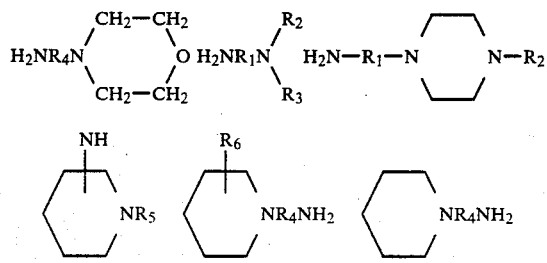

where $R_1$ is an alpha, omega-alkylene group of 2 to 10 carbon atoms where cycloaliphatic, $R_2$ and $R_3$ are alkyl radicals of 1 to 4 carbon atoms, $R_4$ is an alkylene radical of 1 to 10 carbon atoms and $R_5$ is $R_4$ or arylalkyl, $R_6$ is H or alkyl of 1 to 4 carbons, so that said nylon polymer is melt stable. Also, for batch processing, polyethyleneimines of 300 to 1200 molecular weight, methylaminobispropylamine, N-(2-aminoethyl)-1,3-propanediamine, and 3,3'-iminobispropylamine are useful.

5 Claims, 2 Drawing Figures

SUESSEN SET - BECK DYED

METHOD OF SPINNING A NYLON YARN HAVING IMPROVED RETENTION OF A SOIL REPELLENT FINISH ON THE NYLON YARN

This application is a continuation of application Ser. No. 440,881, filed Nov. 12, 1982, now abandoned.

BACKGROUND OF THE INVENTION

With the advent of the soil resistant yarn finish disclosed in U.S. Pat. No. 4,192,754, hereby incorporated by reference, it was desirable to modify the yarn polymer properties to enhance the retention by yarn of the fluorocarbon component in the yarn finish. It was discovered that yarn of deep dyeable polymer which has a high number of amine ends, also has improved permanency of the soil resistant fluorocarbon finish on the yarn. However, the amine additives, used to provide the prior art deep dyeable yarn polymers, such as cyclohexylamine or hexamethylenediamine were not entirely satisfactory. Cyclohexylamine, which is conventionally used in continuous melt polymerization processes to control dyeability and degree of polymerization, for example, did not provide enough amine ends for improved retention of the fluorocarbon component of the yarn finish; and hexamethylenediamine caused runaway polymerization rates, i.e., a polymer melt that was not stable during continuous polymerization and/or spinning of fiber.

SUMMARY OF THE INVENTION

It has been discovered that a melt stable polymer and a polymer that provides deep dyeable yarn with improved retention of the fluorocarbon component of the soil resistant finish for the yarn can be made using the additives of this invention as terminators for the polymer ends. The preferred amount of titratable amine ends is over 80, preferably over 90, gram equivalents per $10^6$ grams of polymer. Also, for melt stability in a continuous melt polymerization process, the product of reactive ends, obtained by multiplying equivalents of reactive amine ends by equivalents of carboxyl ends, must be low, such as preferably about 300 to 1100. This is achieved by producing a polymer with low carboxyl end groups, i.e., about 10 to 25 gram equivalents per $10^6$ grams of polymer. All this is achieved by use of the additives of this invention which provide the necessary additional amine sites for fluorocarbon retention yet are nonreactive. This invention is a method to improve retention of a finish on a nylon yarn, said finish containing a reaction product of the group consisting of propylene oxide, epibromohydrin and epichlorohydrin with the reaction product of pyromellitic dianhydride with a long chain fluoroalcohol, comprising polymerizing said nylon in the presence of between about 0.03 to 1 mole percent of a primary-tertiary diamine or a primary-tertiary triamine of the structure

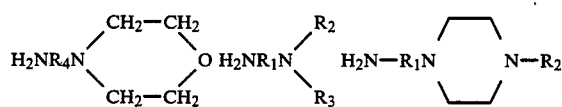

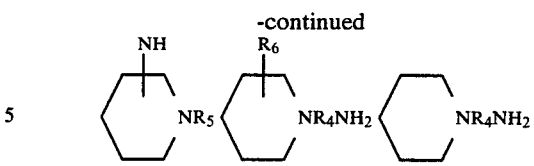

wherein $R_1$ is an alkylene group of 2 to 10 carbon atoms or a cycloaliphatic, $R_2$ and $R_3$ are alkyl radicals of 1 to 4 carbon atoms, $R_4$ is an alkylene group of 1 to 10 carbon atoms and $R_5$ is $R_4$ or an aralkyl, $R_6$ is H or alkyl of 1 to 4 carbon atoms, so that said nylon polymer is melt stable.

When the polymerization is done in a batch process, the above compounds can be used, also the following compounds can be used:
polyethyleneimine of 300 to 1200 molecular weight,
3,3'-diamino-N-methyldipropylamine,
N-(2-aminoethyl)-1,3-propanediamine,
3,3'-iminobispropylamine,
N,N-bisaminopropylpiperazine, and
N-(2-aminoethyl)piperazine.
The preferred polyethyleneimine has the structure

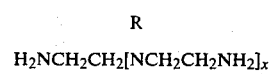

where x is 1 to 40 and R is hydrogen, lower alkyl or

where y is 1 to 40 but x+y must be less than 43. Even more preferred is the polyethyleneimine which has a lower alkyl of 1 to 4 carbon atoms. The above compounds are useful both for continuous, coupled nylon polymerization exemplified in U.S. Pat. No. 4,310,659, hereby incorporated by reference, and batch polymerization. By batch polymerization is meant both conventional one-kettle batch polymerization and the use of a series of kettles for continuous batch polymerization exemplified in U.S. Pat. No. 3,294,756, hereby incorporated by reference.

DESCRIPTION OF THE PREFERRED EMBODIMENTS

Example 1

Figure 1:
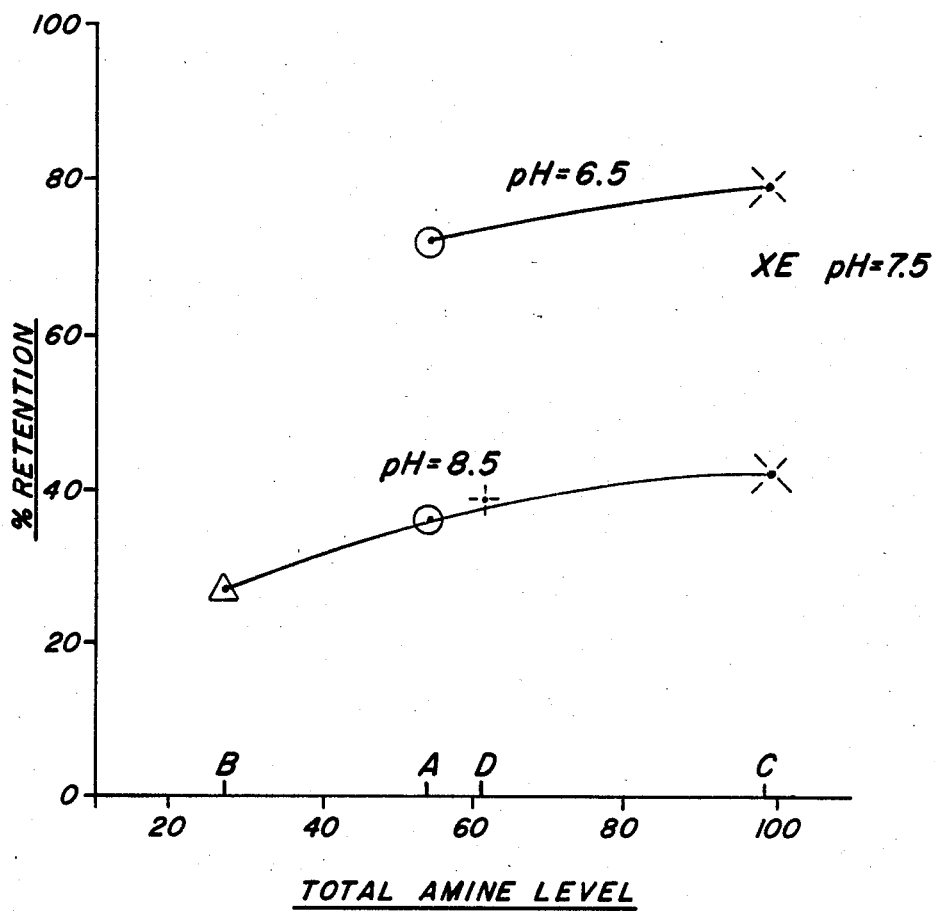
FIG. 1 shows the percent retention of fluorocarbon on fiber at 2 pH levels and 4 total amine levels for Beck-dyed fiber for the process of this invention and the control prior art method. See Table IV.

(A) A polymer was prepared by adding 10.3 grams of N-(3-aminopropyl)morpholine to a mixture of 1520 grams of caprolactam and 80 grams of omega-aminocaproic acid. The mixture was heated to 255° C. over a one-hour period, under a nitrogen atmosphere and then held at 255° C. for 6.5 hours. The polymer was washed 5 times with an equal weight of deionized water and then dried at 100° C. under vacuum for 16 hours. A sample of this polymer was analyzed. The formic acid viscosity was 47, with 10 equivalents of carboxyl and 101 titratable equivalents of amine per $10^6$ grams of polymer.

(B) This polymer was spun at 260° C. into yarn of 30 round filaments having a total denier of 250. The yarn was coated with a finish having an antisoiling fluorocarbon as that disclosed in U.S. Pat. No. 4,192,754, Example 1. The yarn was knitted into sleeves.

Two samples of the knitted sleeves were taken. One sample was steam autoclaved, that is, heat set at 270° F., while the other was not.

Autoclaving consisted of putting the knitted sleeves into an autoclave, evacuating the chamber to 27 inches of vacuum and introducing steam to heat the chamber to 230° F. The chamber is held at 230° F. for five minutes, and the pressure released. The chamber is then repressurized with steam to heat to 230° F. The pressure is held for five minutes and released. Then steam is introduced and the temperature is allowed to rise to 270° F. The pressure is released and then steam is put in again until the temperature is 270° F. It is held for five minutes and again the pressure released. Then it is repressurized to give a temperature of 270° F. for eight minutes. The pressure is then released and the yarns removed from the autoclave.

The sleeves, both the nonheat set and heat set, were submitted for launderometer washing. After one hour of washing and again after five hours of washing, the sleeves were tested for oil drop repellency by A.A.T.C.C. Test Method 118-1975. A rating of 5 is best, 0 worst. Both the nonheat and the heat set sleeves were also tested for retention of the fluorine antisoil agent by use of the Schoniger combustion technique. The fluorides are quantitatively determined using the fluoride specific ion electrode. (See Light, T. S. and Mannion, R. F., "Microdetermination of Fluorine in Organic Compounds by Potentiometer Titration Using a Fluoride Electrode", *Analytical Chemistry*, Vol. 41, 1969, page 107.) This yarn retained 87% of the fluorocarbon which was initially on the yarn. A conventional continuous melt-process control yarn, shown below as Example 2, which had 53 gram-equivalents of amine and 25 gram-equivalents of carboxyl per million grams of polymer retained only 57% of the fluorocarbon.

The one-hour treatment in the launderometer simulates a conventional beck dyeing cycle. The five-hour treatment simulates dyeing and severe scouring of a fiber in use. The data on these yarns are shown in Table I below.

TABLE I

| Example | Additives, | Grams | Polymer, FAV(a) | Carboxyls Per $10^6$ Grams Polymer | Titratable Amines Per $10^6$ Grams Polymer |
|---|---|---|---|---|---|
| 1 | APM[1] | 10.3 | 47 | 10 | 101 |
| 2* | CHA[2] | 6.4 | 51 | 25 | 53 |
| 3 | DEAP[3] | 7.4 | 46 | 19 | 92 |
| 4 | GAMP[4] | 3.9 | 48 | 10 | 102 |
| 5 | GAMP | 3.9 | 53 | 17 | 86 |
| 6 | GAMP | 5.6 | 68 | 20 | 72 |
| 7 | AEP[5] | 8.2 | 41 | 11 | 132 |
| 8 | BAPP[6] | 11.5 | 44 | 11 | 131 |
| 9 | BAPP | 19.3 | 51 | 23 | 123 |
|   | TPA[7] | 16.0 |  |  |  |
| 10 | BAPP | 2.86 | 58 | 26 | 79 |
|   | HMDA[8] | 3.74 |  |  |  |
|   | TPA | 2.4 |  |  |  |
| 11 | BAPP | 2.86 | 59 | 21 | 66 |
|   | CHA | 4.96 |  |  |  |
|   | TPA | 2.4 |  |  |  |
| 12 | BAPP | 8.6 | 47 | 29 | 86 |
|   | CHA | 4.96 |  |  |  |
|   | TPA | 7.13 |  |  |  |
| 13** | HMDA | 2.5 | 63 | 27 | 56 |
| 14** | HMDA | 3.7 | 49 | 30 | 72 |
| 15** | HMDA | 5.8 | 41 | 17 | 72 |
| 16** | HMDA | 7.1 | 39 | 13 | 92 |
| 17 | None, | Control | 57 | 48 | 47 |
| 18 | PEI[9] | 11.9 | 45 | 15 | 182 |
| 19 | PEI | 11.9 | 58 | 11 | 171 |
| 20 | TETA[10] | 5.8 | 58 | 12 | 118 |

| Example | Theoretical Reactive Amine Ends | Product of Reactive Ends | Oil Drop Rating AATCC Method 118-1975 After 1 and 5-Hour Launderometer | | | |
|---|---|---|---|---|---|---|
|  |  |  | Nonheat Set | | Heat Set | |
|  |  |  | 1 Hour | 5 Hours | 1 Hour | 5 Hours |
| 1 | 53 | 530 | 4 | 2 | 4 | 1 |
| 2* | 53 | 1425 | 5 | 4 | 4 | 3 |
| 3 | 54 | 1026 | 2 | 2 | 2 | 0 |
| 4 | 9 | 90 | 4 | 2 | 4 | 2 |
| 5 | 15 | 255 | 4 | 2 | 2 | 3 |
| 6 | 20 | 400 | 3 | 1 | 3 | 0 |
| 7 | 69 | 759 | 4 | 2 | 4 | 1 |
| 8 | 91 | 1001 | 4 | 2 | 3 | 1 |
| 9 | 42 | 966 | 4 | 3 | 4 | 2 |
| 10 | 59 | 1534 | 6 | 3 | 4 | 3 |
| 11 | 46 | 966 | 5 | 2 | 3 | 3 |
| 12 | 57 | 1653 | 5 | 4 | 4 | 3 |
| 13** | 56 | 1512 | 4 | 3 | 3 | 0 |
| 14** | 72 | 2160 | 5 | 2 | 4 | 3 |
| 15** | 72 | 1224 | 5 | 3 | 4 | 3 |
| 16** | 92 | 1196 | 4 | 3 | 5 | 1 |
| 17 | 47 | 2256 | 4 | 3 | 4 | 1 |
| 18 | 130 | 1950 | 5 | 3 | 5 | 3 |
| 19 | 120 | 1320 | 5 | 1–2 | 5 | 3 |
| 20 | 118 | 1416 | 3–4 | 1–2 | 5 | 3 |

| Example | Fluorine Level, ppm | | % Fluorine Retention |
|---|---|---|---|
|  | Before 5-Hour Launderometer | After |  |
| 1 | 368 | 320 | 87 |
| 2* | 509 | 290 | 57 |
| 3 | 238 | 238 | 100 |
| 4 | 428 | 374 | 88 |
| 5 | 420 | 412 | 98 |
| 6 | 294 | 266 | 89 |
| 7 | 368 | 368 | 100 |
| 8 | 287 | 287 | 100 |
| 9 | 387 | 279 | 72 |
| 10 | 381 | 343 | 90 |
| 11 | 317 | 295 | 93 |
| 12 | 434 | 295 | 68 |
| 13** | 400 | 268 | 67 |
| 14** | 543 | 337 | 62 |
| 15** | 323 | 301 | 93 |
| 16** | 357 | 357 | 100 |
| 17 | 505 | 273 | 54 |
| 18 | 504 | 302 | 60 |
| 19 | 544 | 512 | 94 |
| 20 | 512 | 428 | 84 |

NOTES TO TABLE I
[1] N—(3-aminopropyl)morpholine
[2] Cyclohexylamine
[3] N,N—diethyl-1,3-propanediamine
[4] N—(3-aminopropyl)-N'—methylpiperazine
[5] N—(2-aminoethyl)piperazine
[6] N,N'—bis(3-aminopropyl)piperazine
[7] Terephthalic Acid
[8] 1,6-Hexanediamine
[9] Polyethyleneimine (Corcat P12, Cordova Chemical Co.)
[10] Triethylenetetramine
*Control and prior art
**Prior art
(a) Formic acid viscosity Examples 3 Through 20

The polymer preparation, and yarn and sleeve preparation of Example 1 were repeated with the compounds listed, in the amounts shown, under the conditions shown, and providing the results shown in Table I. The yarns of Examples 1 through 17 had 30 round filaments with a total denier of 250. Examples 18, 19, and 20 had 70 Y-shaped filaments with a total denier of 1150.

Examples 1 and 3 through 6 are polymers which could be used in a continuous polymerization process or in a batch process. Examples 7 through 20 can be also used in a batch process. Examples 13 through 16 are prior art.

In Examples 9 through 12, TPA (terephthalic acid) is added so that additional amounts of N,N'-bis(3-aminopropyl)piperazine can be added without decreasing the degree of polymerization.

Example 17 is a control yarn to which the other batch process polymers should be compared.

Example 21

A nylon 6,6 polymer is prepared by dissolving 5840 grams of purified salt made from hexamethylenediamine and adipic acid (22–26 moles) in 5840 grams of water. As a molecular weight regulator, 17.5 grams of cyclohexylamine is added. Sodium hypophosphate, 5 grams, is added as a stabilizer. The mixture is heated to 135° C. in an agitated pressure vessel, holding the pressure to a maximum of 15 psig. After the internal temperature reaches 135° F. the reactor is heated rapidly to an internal temperature of 250° C. The vessel is vented to hold the pressure to a maximum of 250 psig.

After the temperature reaches 250° C. and 250 psi, the pressure is bled off slowly while raising the temperature to 270° C. over a period of 90 minutes. The rate of temperature increase is constant and the rate of pressure release is such that equal fractions of the absolute pressure are released in equal intervals of time.

After the reactor temperature has reached 270° C. and the pressure is 0 psig, nitrogen is swept across the surface of the molten polymer for one hour. Then the agitator is stopped and after 15 minutes the polymer is extruded from the bottom of the reactor and pelletized. The formic acid viscosity is 55 with 20 equivalents of carboxyl ends and 55 equivalents of amine ends per $10^6$ grams of polymer.

This polymer is spun at 285° C. into yarn of 30 round filaments having a total denier of 250. The yarn is coated with the finish described in Example 1, and knitted into a sleeve. After five hours of launderometer washing the yarn retains 60% of the fluorine antisoil agent which was initially on the yarn.

Example 22

A nylon 6,6 polymer is prepared in the same manner as that described in Example 21 except that, in addition, 74 grams of the salt of terephthalic acid and N,N'-bis(3-aminopropyl)piperazine is added to the pressure vessel with the salt solution. After polymerization and pellitizing the polymer, FAV is 55 with 20 equivalents of carboxyl ends and 95 equivalents of amines per $10^6$ grams of polymer.

The polymer is spun and finished as in Example 23, and knitted into a sleeve. After the sleeve is given five hours of launderometer washing, the yarn retains 85% of the fluorine antisoil agent which is coated onto the yarn.

Example 23

A nylon 6,6 polymer is made as described in Example 21, but with the addition of 25.4 grams of N-(3-aminopropyl)morpholine instead of 17.5 grams of cyclohexylamine. The resulting polymer has a formic acid viscosity of 55 with 20 carboxyls and 90 amines per $10^6$ grams of polymer.

The polymer is spun and finished as in Example 21, and knitted into a sleeve. After the sleeve is given five hours of launderometer washing the yarn retains 90% of the fluorine antisoil agent which is coated onto the yarn.

Continuous Polymerization Examples

A comparison of the polymer of the method of this invention with a nylon 6 terminated with an amine containing no tertiary amino groups, cyclohexylamine, was made with polymers prepared with the process and apparatus similar to that shown in U.S. Pat. No. 4,310,659, hereby incorporated by reference, in toto. The following Table II shows the polymers used in the trials.

TABLE II

| Polymer Designation | Primary Amines* | Tertiary Amines* | Total Amines* | Terminator |
|---|---|---|---|---|
| A | 54 | 0 | 54 | CHA |
| B | 27 | 0 | 27 | CHA/HAC |
| C | 54 | 44 | 98 | APM |
| D | 27 | 34 | 61 | APM/HAC |

*In mol equivalents per $10^6$ grams of polymer
Terminators
"HAC" — Acetic Acid
"CHA" — Cyclohexylamine

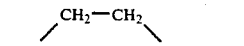

"APM" — N—(3-Aminopropyl)morpholine

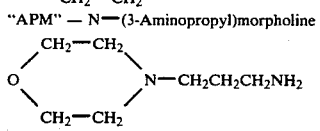

The resulting polymers were spun with a finish similar to that of Example 1 of U.S. Pat. No. 4,192,754 under conventional conditions into fibers and conventionally processed into staple yarn, dyed and tested for fading on knitted sleeves with the following results. A surprising improvement of over 0.5 on a Gray scale shows in ozone fastness in Table III.

TABLE III

| Shade | DAL NO.* | B | D | A | C |
|---|---|---|---|---|---|
| XENON LIGHT FASTNESS 100 SFU (GRAY SCALE), AATCC-16E | | | | | |
| Burlington Gray | 2008 | +4 | 3–4 | 3 | 3 |
| Tectilon Olive | 3015 | 3–4 | 3–4 | 3 | 3 |
| Lightfastness Beige #1 | 5010 | 4 | 4 | 4 | 4 |
| Burlington Rose | 7001 | +4 | 3 | 4 | 4 |
| Toasted Chestnut | 9116 | 5 | 5 | 5 | 5 |
| Renoir Rose | 9153 | 4 | 4 | +3–4 | 2–3 |
| Argent Grey | 9529 | 2 | +2–3 | 2 | −2 |
| Average Gray Scale (n = 7) | | 3.79 | 3.64 | 3.5 | 3.36 |
| Delta | | | −0.15 | | −0.14 |
| OZONE FASTNESS AATCC-129, 3 CYCLES (GRAY SCALE) | | | | | |
| Burlington Gray | 2008 | 1–2 | 1–2 | 3 | 4 |
| Tectilon Olive | 3015 | 2–3 | 5 | 4–5 | 4–5 |
| Lightfastness Beige | 5010 | 1–2 | 3 | 2–3 | 3–4 |
| Burlington Rose | 7001 | 2 | 2 | 3 | 4 |
| Toasted Chestnut | 9116 | 5 | 5 | 3–4 | 4–5 |
| Renoir Rose | 9153 | 4 | 4 | 3–4 | 2–3 |
| Argent Grey | 9529 | 2 | 2–3 | 2 | 2 |

TABLE III-continued

| Shade | DAL NO.* | B | D | A | C |
|---|---|---|---|---|---|
| Average Gray Scale (n = 7) | | 2.21 | 2.93 | 3.57 | 4.07 |
| Delta | | — | +0.72 | | +0.5 |

*The Dyeing Application Laboratory (DAL) number is explained following this table.

DYE APPLICATION LABORATORY (DAL) FORMULATIONS

% By Weight on Fabric

NUMBER 2008

Dyes
| | |
|---|---|
| Tectilon Red 2B (Acid Red 361) | 0.05 |
| Tectilon Orange 3G (Acid Orange 156) | 0.04 |
| Telon Blue BRL (Acid Blue 324) | 0.05 |

Conditions
Liquid to Fabric Ratio 30/1
Temperature, °F. - Boil
Time, Minutes - 45
pH by MSP/TSP (1) - 7.0
Chemicals Added: Dowfax 2A1 (2) - 1.5%

NUMBER 3015

Dyes
| | |
|---|---|
| Tectilon Blue 4R (Acid Blue 277) | 0.018 |
| Tectilon Red 2B (Acid Red 361) | 0.048 |
| Tectilon Yellow 4R (Acid Yellow 219) | 0.030 |

Conditions
Liquid to Fabric Ratio 30/1
Temperature, °F. - 205
Time, Minutes - 45
pH by MSP/TSP (1) - 7.0
Chemicals Added: Triton X-100 - 0.5% (3)

NUMBER 5010

Dyes
| | |
|---|---|
| Tectilon Yellow 4R (Acid Yellow 219) | 0.092 |
| Tectilon Red 2B (Acid Red 361) | 0.061 |
| Tectilon Blue 4R (Acid Blue 277) | 0.057 |

Conditions
Ratio of Liquid to Fabric - 30/1
Temperature, °F. - 205
Time, Minutes - 60
pH by MSP/TSP (1) - 7.0
Chemicals Added: Dowfax 2A1 - 1.5%

NUMBER 7001

Dyes
| | |
|---|---|
| Tectilon Red 2B (Acid Red 361) | 0.17 |
| Tectilon Orange 3G (Acid Orange 156) | 0.079 |
| Telon Blue BRL 200% (Acid Blue 324) | 0.032 |

Conditions
Ratio of Liquid to Fabric - 30/1
Temperature - Boil
Time, Minutes - 45
pH by MSP/TSP (1) - 7.0
Dowfax 2A1 - 1.5%

NUMBER 9116

Dyes
| | |
|---|---|
| Telon Blue BRL 200% (Acid Blue 324) | 0.0992 |
| Tectilon Red 2B (Acid Blue 361) | 0.2529 |
| Tectilon Yellow 4R (Acid Yellow 219) | 0.2454 |

Conditions
Ratio of Liquid to Fabric - 30/1
Temperature °F. - 205
Time, Minutes - 45
pH by MSP/TSP (1) - 7.0
Chemicals Added:
Dowfax 2A1 - 1.0%
Triton X-100 - 0.5%

NUMBER 9153

Dyes
| | |
|---|---|
| Telon Blue BRL 200% (Acid Blue 324) | 0.0110 |
| Tectilon Red 2B (Acid Blue 361) | 0.0937 |
| Tectilon Orange 3G (Acid Orange 156) | 0.0359 |

Conditions
Liquid to Fabric Ratio - 30/1
Temperature, °F. - 205
Time, Minutes - 45
pH by MSP/TSP (1) - 7.0
Chemicals Added:
Dowfax 2A1 - 1.0%
Triton X-100 - 0.5%

NUMBER 9529

Dyes
| | |
|---|---|
| Telon Blue BRL 200% (Acid Blue 324) | 0.0135 |
| Tectilon Red 2B (Acid Red 361) | 0.0121 |
| Tectilon Orange 3G (Acid Orange 156) | 0.0115 |

Conditions
Liquid to Fabric Ratio - 30/1
Temperature, °F. - 205
Time, Minutes - 45
pH by MSP/TSP (1) - 7.0
Chemicals Added:
Dowfax 2A1 - 1.0%
Triton X-100 - 0.5%

(1) MSP is monosodium phosphate
TSP is trisodium phosphate
(2) Dowfax 2A1 is a sodium dodecyl diphenyl-oxide disulfonate - anionic liquid
(3) Triton X-100 is alkanyl polyether alcohol, a nonionic surfactant, from Rohm & Haas Most importantly, a surprising improvement in fluorine retention of 4% to over 10% was found when measuring amounts of fluorocarbon from the spin finish remained on the fiber, with no loss of floor wear performance, including the improved staining and soiling of the carpet due to fluorocarbon on the fiber. The results in FIG. 1 are averages of tests of fibers of the polymers shown, Beck dyed yellow at the pH of the dye bath shown. The fiber was crimp set conventionally with Suessen equipment. Overall percent retention is affected by pH as can be seen in FIG. 1. The raw data used to calculate the points of FIG. 1 are shown in the following Table IV.

TABLE IV

Figure 2:
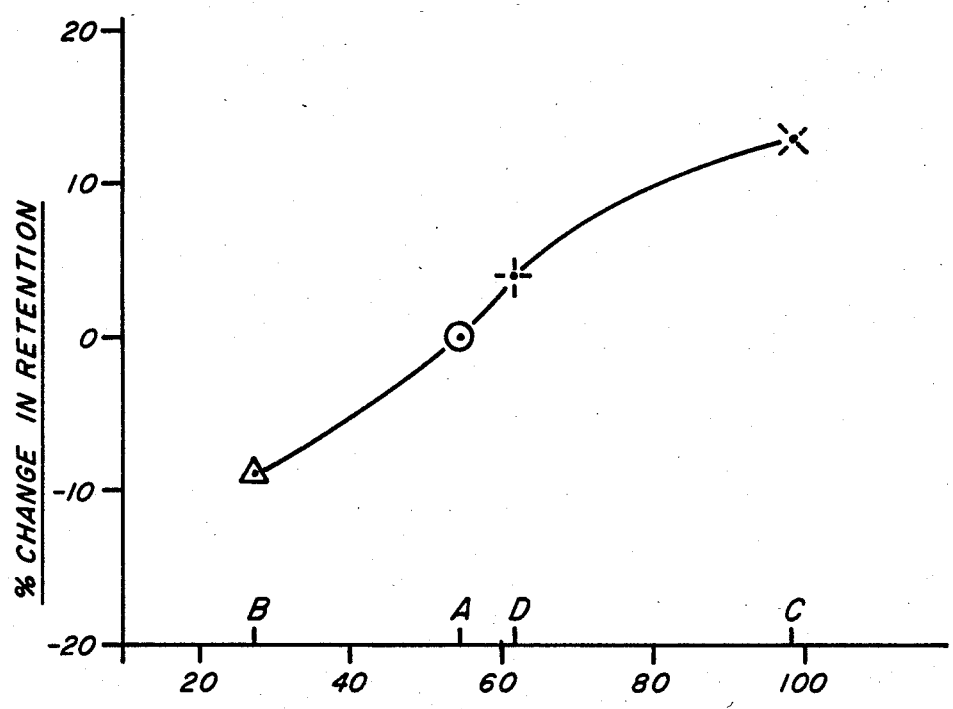
FIG. 2 is a reworking of the data in FIG. 1 to "damp-out" the effect of dye bath pH as explained in the text regarding Table IV.

Yarn 1 is bright, 2.7 modification ratio "Y" cross section, deep dyeable, 15 denier per filament staple yarn, crimp stabilized. The fluorocarbon level was 0.14 weight percent.
Yarn 2 is bright, 3.0 modification ratio, "Y" cross section, deep dyeable, 17 denier per filament staple yarn, crimp stabilized, with 0.14 weight percent fluorocarbon.
Yarn 3 is bright, 2.7 modification ratio "Y" cross section, medium dyeable 15 denier per filament staple yarn, crimp stabilized, with 0.14 weight percent fluorocarbon.
Polymer A is terminated with 44 equivalents cyclohexylamine per $10^6$ grams polymer.
Polymer B is terminated with 34 equivalents cyclohexylamine per $10^6$ grams polymer and with 27 equivalents acetic acid per $10^6$ grams polymer.
Polymer C is terminated with 44 equivalents aminopropyl morpholine per $10^6$ grams polymer.
Polymer D is terminated with 34 equivalents aminopropyl morpholine per $10^6$ grams polymer and with 27 equivalents acetic acid per $10^6$ grams polymer.
Polymers A and B are comparative, prior art polymers. Finally, to "damp-out" the effect of dye bath pH, FIG. 2 was prepared from data in Table IV "Averaging", showing a 4% to 10% improvement in fluorine retention over the best prior art polymer. Using percent change in retention rather than the actual percent retention eliminates differences due to pH.

TABLE IV-continued

RUN 1 - YARN 1

|  | Polymer A |  | Polymer C |  |
|---|---|---|---|---|
| Suessen Set Beck Dyed (1) | 506 | 572 | 559 | 319 |
| 1 Hr. | 307 | 391 | 320 | 238 |
| 3 Hrs. | 225 | 293 | 251 | 203 |
| 5 Hrs. | 176 | 198 | 191 | 197 |
| 8 Hrs. | 156 | 160 | 175 | 162 |

YARN 2

|  | Polymer A |  | Polymer C |  |
|---|---|---|---|---|
| Suessen Set Beck Dyed (1) | 585 | 560 | 561 | 514 |
| 1 Hr. | 242 | 244 | 293 | 285 |
| 3 Hrs. | 197 | 188 | 223 | 212 |
| 5 Hrs. | 170 | 160 | 183 | 186 |
| 8 Hrs. | 159 | 150 | 231 | 150 |

YARN 3

|  | Polymer B | Polymer D |  |
|---|---|---|---|
| Suessen Set Beck Dyed (1) | 604 | 568 | 448 |
| 1 Hr. | 248 | 302 | 236 |
| 3 Hrs. | 186 | 242 | 195 |
| 5 Hrs. | 173 | 190 | 138 |
| 8 Hrs. | 110 | 169 | 126 |

(1) Beck dyed at pH 8.5

AVERAGING OF DATA ABOVE RUN NO. 1

|  | ppm Fluorine |  |  | Average | % Retention |
|---|---|---|---|---|---|
| YARNS 1 AND 2 - POLYMER A | | | | | |
| Suessen Set Beck Dyed (1) | 506 | 585 | 560 | 550 | 100 |
| 1 Hour | 307 | 242 | 244 | 264 | 48.0 |
| 3 Hours | 225 | 197 | 188 | 203 | 36.9 |
| 5 Hours | 176 | 170 | 160 | 169 | 30.7 |
| 8 Hours | 156 | 159 | 150 | 155 | 28.2 |
| YARNS 1 AND 2 - POLYMER C | | | | | |
| Suessen Set Beck Dyed (1) | 572 | 559 | 561 | 514 | 552 | 100 |
| 1 Hour | 391 | 320 | 293 | 285 | 322 | 58.3 |
| 3 Hours | 293 | 251 | 223 | 212 | 245 | 44.4 |
| 5 Hours | 198 | 191 | 183 | 186 | 190 | 34.4 |
| 8 Hours | 160 | 175 | 231 | 150 | 179 | 32.4 |
| YARN 3 - POLYMER D | | | | | |
| Suessen Set Beck Dyed (1) | 568 | 448 | | 508 | 100 |
| 1 Hour | 302 | 236 | | 269 | 53.0 |
| 3 Hours | 242 | 195 | | 219 | 43.1 |
| 5 Hours | 190 | 138 | | 164 | 32.3 |
| 8 Hours | 169 | 126 | | 148 | 29.1 |
| YARN 3 - POLYMER B | | | | | |
|  |  |  |  | 604 | 100 |
|  |  |  |  | 248 | 41.1 |
|  |  |  |  | 186 | 30.8 |
|  |  |  |  | 173 | 28.6 |
|  |  |  |  | 110 | 18.2 |

RUN 2 - YARN 1

|  | Polymer A | | Polymer C | |
|---|---|---|---|---|
|  | ppm Fluorine | % Rentention | ppm Fluorine | % Retention |
| Nonheat Set | 555 | 100 | 551 | 100 |
| Suessen Set Beck Dyed (2) | 549 | 98.9 | 475 | 86.2 |
| 1 Hour. | 510 | 91.9 | 488 | 88.6 |
| 2 Hours | 422 | 76.0 | 439 | 79.7 |
| 3 Hours | 407 | 73.3 | 459 | 83.3 |
| 4 Hours | 332 | 59.8 | 403 | 73.1 |
| 5 Hours | 326 | 58.7 | 454 | 82.4 |
| 6 Hours | 340 | 61.3 | 383 | 69.5 |
| 7 Hours | 325 | 58.6 | 403 | 73.1 |

(1) pH 8.5
(2) pH 6.5

Example 24 (Comparative)

A polymer was prepared by the process exemplified in U.S. Pat. No. 3,294,756 using no terminator to form a light stable bright polymer, spun under conventional spinning processing to form a commercial yarn and tested for the properties in Table I with the following results:

FAV—56
Carboxyls per $10^6$ grams per polymer—48
Theoretical Reactive Amine Ends—48
Product of Reactive Ends—2400
Oil Drop Rating—
  Nonheat set—2
  Heat set—0
Fluorine level, ppm—Before—388
  After 5 hours launderometer—299
% Fluorine retention—77

We claim:
1. A method to improve retention of a soil repellent finish on nylon yarn, said finish containing the reaction product of the group consisting of propylene oxide, epibromohydrin and epichlorohydrin with the reaction product of pyromellitic dianhydride with a long chain fluoroalcohol, comprising continuously polymerizing precursors of said nylon in contact with between about 0.03 and 1 mol percent of a primary-tertiary diamine or a primary-ditertiary triamine of the structure

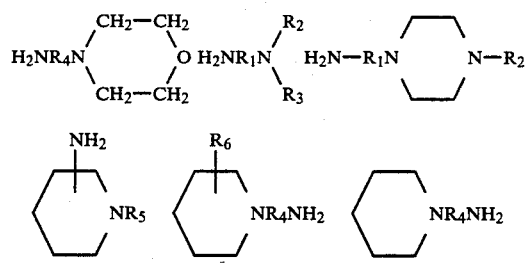

where
  $R_1$ is an alpha, omega alkylene or group of 2 to 10 carbon atoms or a cyclo aliphatic,
  $R_2$ and $R_3$ are alkyl radicals of 1 to 4 carbon atoms,
  $R_4$ is an alkylene group of 1 to 10 carbon atoms,
  $R_5$ is $R_4$ or aralkyl, and
  $R_6$ is H or alkyl of 1 to 4 carbons so that said nylon is melt stable, continuously spinning said nylon into a yarn and coating said yarn with said finish, thereby improving retention of said finish on said yarn on exposure to heated water.

2. The method of claim 4 wherein the polyethyleneimine has the structure

where x is 1 to 40 and R is hydrogen, lower alkyl or

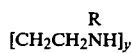

where y is 1 to 40, but x+y must be less than 43.

3. The method of claim 2 wherein the lower alkyl has 1 to 4 carbon atoms.

4. A method to improve retention of a soil repellent finish or nylon yarn, said finish containing the reaction product of the group consisting of propylene oxide, epibromohydrin and epichlorohydrin with the reaction product of pyromellitic dianhydride with a long chain fluoroalcohol, comprising polymerizing precursors of said nylon in a batch process in contact with between about 0.03 and 1 mol percent of a compound selected from the group consisting of polyethyleneimine of 300 to 1,200 molecular weight, 3,3'-diamino-N-methyldipropylamine, N-(2-aminoethyl)-1,3-propanediamine, 3,3'-iminobispropylamine, and a primary-tertiary diamine or a primary-ditertiary triamine of the structure

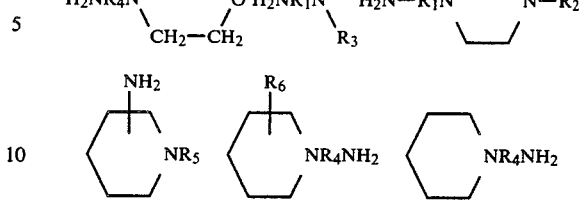

where
  $R_1$ is an alpha, omega alkylene or group of 2 to 10 carbon atoms or a cyclo aliphatic,
  $R_2$ and $R_3$ are alkyl radicals of 1 to 4 carbon atoms,
  $R_4$ is an alkylene group of 1 to 10 carbon atoms,
  $R_5$ is $R_4$ or aralkyl, and
  $R_6$ is H or alkyl of 1 to 4 carbons so that said nylon is melt stable, spinning said nylon into a yarn and coating said yarn with said finish, thereby improving retention of said finish on said yarn on exposure to heated water.

5. The method of claim 1 wherein the yarn is dyed and dye retention is improved on exposure to ozone.

* * * * *